Nov. 4, 1952 P. C. KEITH 2,616,898
OXIDATION OF HYDROCARBONS
Filed Dec. 8, 1948 3 Sheets—Sheet 1

INVENTOR
Percival C. Keith
BY E. F. Liebrecht
Cruzan Alexander
ATTORNEYS

Patented Nov. 4, 1952

2,616,898

UNITED STATES PATENT OFFICE 2,616,898

OXIDATION OF HYDROCARBONS

Percival C. Keith, Peapack, N. J., assignor to The M. W. Kellogg Company, Jersey City, N. J., a corporation of Delaware Continuation of application Serial No. 440,270, April 23, 1942. This application December 8, 1948, Serial No. 64,180

5 Claims. (Cl. 260—342)

The present invention relates to improvements in chemical conversions involving the contacting of a reactant in the gaseous or vapor phase with particles of a solid contact agent. This application is a continuation of my prior application S. N. 440,270, filed April 23, 1942, now abandoned.

The invention, although not limited thereto, is especially well exemplified and advantageous in its application to the production of intermediate stage conversion products in satisfactory yields and quality by reactions, both organic and inorganic, which proceed successively through several stages, but normally pass through such stages, due to the difficulty of temperature control or other reasons, at such a rate that ultimate conversion products are inevitably produced of relatively little or no value. Certain hydrocarbon conversion reactions are illustrative of such reactions and are particularly contemplated in the practice of the invention. Such hydrocarbon conversion reactions include the oxidation of hydrocarbons, including the light and normally gaseous aliphatic hydrocarbons, to intermediate oxidation products such as alcohols, aldehydes, ketones and organic acids and the partial oxidation of aromatic hydrocarbons to such products as maleic acid, benzoic acid, phthalic anhydride, and the like. The process is likewise applicable to inorganic reactions exemplified by the conversion of hydrochloric acid to chlorine by catalytic oxidation. Also, the process may be applied to the decomposition of light hydrocarbons such as ethane, and butane to intermediate decomposition products such as acetylene, butene and butadiene.

The particles of solid contact material utilized in the process in its various embodiments may function severally or jointly in any one of several modes, either as a solid reactant which undergoes chemical interaction with the gaseous component, as a catalyst to accelerate the reaction in the desired direction, or as a means to control physical conditions such as temperature within desired limits. Further, in certain instances one or more of these functions may be performed by a solid contact material containing a single component, or the solid contact material may comprise two or more separate components each of which performs one or more of these functions.

One of the important objects of my invention is the provision of a process wherein the temperature of the conversion zone may be readily controlled within desired limits for the purpose of producing satisfactory yields and qualities of intermedite conversion products of the type above described. A further object is the provision of a method which may be practiced on a large commercial scale and with commercially available equipment and under prevailing commercial operating conditions.

One of the features of the invention resides in the provision of the solid contact material in the conversion zone in relatively high concentrations. In certain aspects, the invention particularly contemplates the introduction of particles of contact material of controlled settling characteristics and in controlled amounts into a reaction zone and the flowing of the reactant in the vapor phase upwardly through said zone at a velocity adapted to produce a highly turbulent and dense pseudo-liquid phase of the solid particles whereby temperature control within desired limits is greatly facilitated and various other advantages attained. In certain other aspects, the invention contemplates a cyclic operation whereby continuous operation is accomplished by circulating the contact material successively through a conversion zone and thence through a revivification zone, either or both of the zones containing therein a dense, highly turbulent phase of solid particles.

Heretofore, it has been proposed to carry out chemical reactions under conditions adapted for intermittent or batch operation, and according to a procedure involving passing an aeriform fluid upwardly through a substantially stationary mass of confined, substantially uniformly sized granular particles of the order of ⅛ inch or more in diameter, at such a rate that the particles assume limited freedom of movement, and are placed in vibrant motion by, but are not entrained in the aeriform fluid. The present process, while bearing some resemblance to this heretofore proposed process, differs therefrom in a number of important and essential aspects. The dense pseudo-liquid phase of solid particles utilized in the present process is characterized by the extreme random and circulatory movement of the individual particles throughout the entire mass. This phenomenon is not due to a temperature differential between the particles in the various parts of the mass since it exhibits itself in a system wherein no such differential exists. A further feature of the process resides in the utilization of relatively finely divided particles, either partially or entirely to form the solid component of the dense, highly turbulent pseudoliquid phase. This phase preferably comprises or may even consist entirely of particles of such a degree of fineness that their "free settling rate" is sufficiently low to permit them to be entrained and carried out of the reaction zone with the upwardly flowing gaseous component even at the relatively low velocities contemplated by the process. A further feature of the process resides in the preferred utilization of a mixed range of sizes in preference to uniformly sized particles.

Pursuant to the present process, after the dense, highly turbulent phase of solid particles is initially established to a desired depth or level in the reaction zone, additional quantities of solid particles preferably are continually added thereto at a rate at least as great as the rate at which particles are carried out overhead in "true" entrainment in the gas. The turbulent pseudo-liquid phase may be established initally by introducing the particles of solid contact material into the reaction zone through which the gaseous component is flowing upwardly at a relatively low velocity, in quantities and at a rate greater than that a which the gaseous component is capable of carrying particles upwardly out of the zone in true entrainment. Due to this excess "loading," and to the extent thereof, the desired pseudo-liquid phase is gradually built-up in the conversion zone. The position of the upper level of the dense phase and hence the depth of this phase may be controlled by any one of the several procedures. For example, after the level has reached any particular horizontal plane it may be stabilized in this position by decreasing the quantity of solid particles initially introduced, and by thereafter adding them in amount exactly corresponding to the rate at which the particles are carried out of the reactor in true entrainment in the gaseous component. By a second method, the level is stabilized at the desired height by withdrawing solid particles directly from the dense turbulent phase at a rate corresponding to the quantity added in excess of that capable of being carried out of the reaction zone in true entrainment. By a third method, the height of the level is predetermined by suitable dimensioning of the height of the reaction vessel. This third method is based on the fact that as the dense turbulent mass is allowed to gradually build up beyond a certain maximum height, the quantity of material carried out overhead through the high velocity gas outlet gradually exceeds that capable of being carried in true entrainment and finally the level rises to a height at which solid particles are carried out overhead through the high velocity outlet at the same rate at which particles are added. It has been found that under such conditions the level of the dense phase always occurs at a fixed distance below the high velocity outlet and accordingly the depth of the dense turbulent phase may be maintained at any desired value by initially designing the reaction vessel to a suitable height. When employing this third method, the level may be further adjusted by projecting the high velocity gas outlet downward into the reaction zone to any desired distance, thereby reducing it from the maximum fixed by the overall height of the reaction vessel to any desired minimum. The apparent anomaly of this condition, wherein the loading of solid particles in the low velocity zone intermediate the upper dense phase level and the opening to the high velocity outlet is in excess of the loading possible under "true entrainment" conditions, is explainable on the basis that the additional "lifting effect" is due to the additional energy or work supplied to the system by the displacing action of added solid particles in excess of that loading capable of being carried in "true entrainment" in the gas. The "true entrainment" loading is essentially determined, other conditions being constant, by the particular velocity of the gas.

Various suitable modes of practicing the invention, and its application to particular chemical reactions, are described hereafter for the purpose of illustration only, including the conversion of hydrocarbons to intermediate oxidation products pursuant to two different embodiments, one wherein the solid contact material interacts chemically with the gaseous component or components, and another wherein this material functions primarily as a catalyst.

The direct oxidation of hydrocarbons to the oxides of carbon and water is, as is well known, readily accomplished. Also well known is the fact that the oxidation occurs stepwise, the first step involving the formation of oxygenated organic intermediates such as alcohols, aldehydes, ketones, organic oxides, esters, etc., which are of more value than the ultimate products of oxidation, namely, oxides of carbon and water. Heretofore many proposals have been made directed toward control of the oxidation reaction so that it would stop at the desired intermediate conversion product. However, all of these procedures have serious disadvantages. There are three chief sources of difficulty in carrying out such conversions, namely, (1) the high temperature necessary to initiate the oxidation, (2) the highly exothermic nature of the oxidation reactions, and (3) the fact that the desired intermediate conversion products are more readily oxidized than the hydrocarbons from which they were derived. The provision of a process whereby these deficiencies are largely obviated is an outstanding feature of the present invention.

In the drawings

Figures 1, 4:
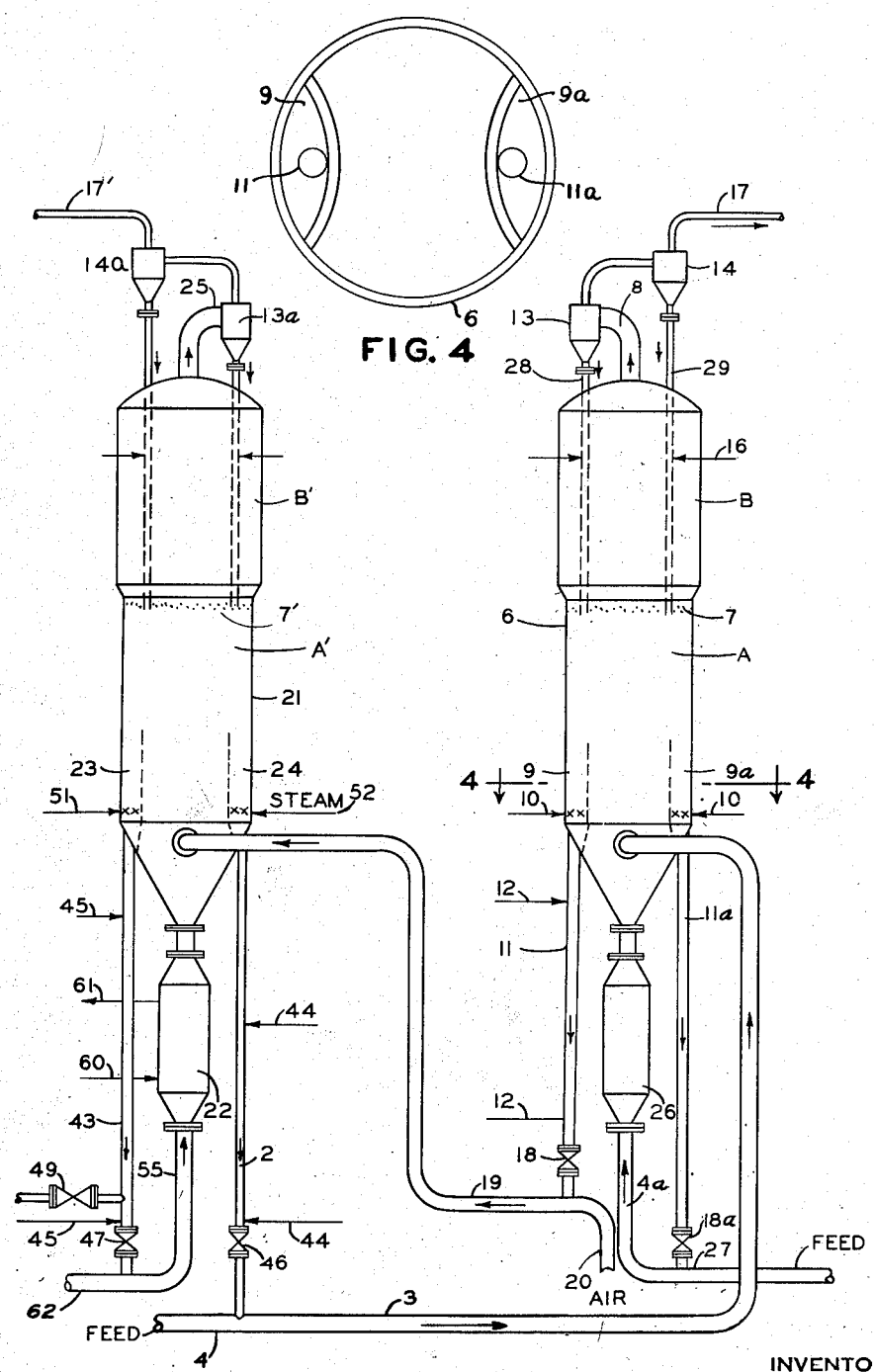
Fig. 1 illustrates diagrammatically a suitable arrangement of apparatus and process flow capable of general application for practicing the invention by an embodiment involving a continuous cyclic process.
Fig. 4 is a sectional view taken along the line 4—4 of Figure 1.

Referring to Fig. 1, a suitable reactant or reactants in the gaseous or vapor phase, is introduced into the system through line 4 to reactor inlet line 3. A finely divided powdered solid contact agent is introduced from line 2 at a suitable rate regulated by valve 46 into a stream of the feed vapors traveling at a relatively high velocity through the reactor inlet line 3. The solid contact agent and vaporous reactant may in certain cases be heated prior to their mixture in line 3. The contact agent thus introduced is picked up by the vaporous reactant and carried therewith through line 3 and introduced into the lower part of reactor 6.

Reactor 6 is a vessel in the form of a cylinder or other suitable shape, having a relatively large cross-sectional area compared with the cross-sectional area of the vapor inlet line 3, and these relative proportions cause a corresponding reduction in the velocity of the vapors after their passage from inlet line 3 into the reactor. Since the gas travels through line 3 at a relatively high velocity, it is capable of carrying a loading of the solid particles much greater than the loading of such particles which may be carried in true entrainment at the relatively low gas velocity maintained in reactor 6. The quantity of particles introduced through line 2 in excess of this maximum true entrainment loading gradually accumulates in the reactor to produce the desired highly turbulent, pseudo-liquid phase as previously described. When the upper level of this phase has reached a desired height, indicated by dotted line 7, it may be held substantially constant by withdrawal of solid particles through a suitable outlet 9 opening directly into the dense phase at a rate corresponding to the amount added in excess of the true entrainment loading at the gas velocity maintained in the reactor, as previously described. The level may also be stabilized at the desired position by decreasing the quantity of particles added to the dense phase through line 2 and other sources, to a rate corresponding to said true entrainment loading. If neither of these expedients is employed, the level will gradually rise to a fixed maximum distance below the high velocity outlet 8, and the quantity of solid particles traveling through the intermediate solid-gas disengaging zone B in excess of the true entrainment value will gradually increase during this upward rise of the level until solid particles are withdrawn from the system at the same rate at which they are introduced to the reactor. Since the height of the level in this instance is always a fixed distance from the high velocity outlet 8 (the particular distance being fixed by the constants of the system), it may be depressed from the maximum to any desired minimum height of projecting the outlet 8 downward into the reactor to a distance corresponding to the desired reduction in depth of the dense phase.

The highly turbulent and circulatory motion of the solid particles in the dense phase produced, as above described, results in the maintenance of a substantially uniform temperature throughout the dense phase zone and the lack of a decided temperature gradient therein, regardless of the fact of whether heat is developed or absorbed by the particular conversion involved. This turbulent movement further assures a substantial homogeneous composition of the solid particles throughout the dense phase, regardless of any progressive change which occurs in the individual particles during the conversion. The optimum velocity with respect to its minimum and maximum value will be dependent upon the densities, sizes and shapes of the solid particles employed, and for any particular set of conditions this velocity is preferably adjusted so as to maintain the desired highly turbulent dense phase condition. For example, employing a finely divided powdered contact agent consisting of a range of mixed size particles, all or most of which are smaller than 100 microns, a gas velocity within the range of about 1.0 to 2 ft. per second is regarded as preferable. The minimum velocity for a finely powdered contact agent consisting predominately of particles smaller than 100 microns normally will exceed about 0.5 ft. per second in order to maintain the desired degree of turbulence. The foregoing numerical values are illustrative of suitable relations when utilizing solid particles having a density corresponding to that of clay, and a gas having a viscosity similar to air.

A suitable inert gas such as steam or the like is preferably introduced in the lower portion of the catalyst withdrawal passageway 9 through line 10 to displace or strip conversion product vapors mixed with or adsorbed on the withdrawn contact material and to maintain it in aerated flowable condition. The contact material is withdrawn from passageway 9 through a standpipe 11 to which an inert aerating medium is supplied by means of inlet lines 12 distributed at suitable intervals along the standpipe 11 to maintain the catalyst flowing through in a state wherein it approximates a liquid with respect to its flow characteristics but preferably in a denser and less turbulent condition than that maintained in the turbulent pseudo-liquid phase (zone A).

A withdrawal passageway 9a similar to 9 may be provided for the withdrawal of a recycle stream of the solid contact material. The recycle stream may be withdrawn through a standpipe 11a similar to 11 and recycled by way of line 4a through a heat exchanger or cooler 26 and back to the dense phase zone A for the purpose of temperature control therein. Part of the gaseous feed may be introduced through line 27 to pick up the contact material discharged from standpipe 11a and convey it through line 4a.

In practicing the process with apparatus such as shown in Fig. 1 and utilizing an outlet opening directly into the dense phase for withdrawing solid particles separately from the gaseous component such as outlet 9, the preferred procedure is to maintain the upper level 7 sufficiently low to provide an ample solid-gas disengaging space B intervening between the high velocity outlet 8 and the upper level of the dense phase to reduce the quantity of solids carried overhead through outlet 8 to a minimum value, that is, a value corresponding to the maximum true entrainment loading at the relatively low velocities maintained in zone B. This procedure has the advantage of reducing the quantity of solid particles which must be eventually recovered from the reaction vapors to a minimum amount with a consequent reduction in size and cost of the recovery equipment. However, it will be apparent that the relative proportion of material withdrawn through outlet 9 may be varied within wide limits from a maximum as in the normally preferred case indicated above to a zero value as in the case when valve 18 is closed (or outlet 9 omitted) and solid particles are withdrawn overhead through line 8 at the same rate at which they are introduced.

The gaseous conversion products withdrawn through outlet 8 may be passed through any suitable type of gas solid recovery system for the separation of the solid particles entrained therewith. As shown, this system may suitably comprise a series of cyclone separators 13 and 14 through which the gas mixture is successively passed at a high velocity. Separated solid particles withdrawn from the bottom of the cyclones may suitably be returned to the dense phase zone A through the cyclone tail pipes 28 and 29. After separation of the entrained solid particles, the gaseous conversion products may be passed by line 17 to any suitable type of recovery equipment such as an absorber, scrubber, fractionating tower, or the like.

In instances wherein the used or spent contact material is circulated in a cyclic process between a conversion zone and a revivification zone, suitable provision is made for any difference in pressure between these zones and the points of withdrawal and points of introduction of the catalyst. In the system shown, the pressure at the bottom of standpipe 11 includes the pressure head provided by the aerated material in the standpipe, the head of contact material in zone A and the static pressure in zone B in excess of atmospheric pressure. Standpipes 11, 11a and other similar outlet standpipes, are made of a suitable height to largely or entirely compensate for pressure differential between the point of withdrawal and point of introduction of the contact material.

The process flow and apparatus utilized in the regeneration stage may be substantially similar, as illustrated, to that shown and described with respect to the conversion stage. Dependent upon the particular chemical conversion involved, the reaction involved in one of these stages may be exothermic, and endothermic in the other stage, or vice versa, or both stages may be either exothermic or endothermic in character, and to varying degrees. Dependent upon the particular requirements of the conversion involved, the heat exchangers 22 and 26 may be operated either as coolers or heaters for the recycle stream of contact material and the quantity of recycle material is varied pursuant to the heat requirements of the system. Likewise, either stage may readily be operated at a pressure different from that utilized in the other stage by utilizing standpipes such as standpipes 11 and 2 of a suitable height to balance the pressure differential involved.

From the bottom of standpipe 11 used contact material is fed under the influence of this pressure to a suitable feeding means such as valve 18 into inlet line 19 leading to the revivification zone. Used catalyst thus introduced is mixed with air or other suitable revivifying medium introduced into line 19 by line 20.

The mixture of used contact material and carrying medium flows through line 19 into the bottom inlet hopper "B" of the regenerator 21. In certain cases it may be mixed with a stream of recycled contact material withdrawn from heat exchanger or cooler 22. Operating conditions in the revivification zone may be suitably regulated within limits to provide a condition similar to that maintained in the conversion zone with respect to providing a dense turbulent pseudo-liquid phase of the solid particles. During the course of the travel of the used contact material through the revivification chamber, it is restored to a condition suitable for reuse in the conversion zone. Revivified contact material may be withdrawn directly from the dense phase zone A' by means of a withdrawal passageway or passageways opening directly into this zone. In the embodiment shown, two such passageways 23 and 24 extending a substantial distance up zone A' are provided. Outlet 23 serves for the withdrawal of regenerated contact material which is recycled by means of standpipe 43 and line 55 through a heat exchanger or cooler 22 through which a cooling or heating medium is circulated by lines 60 and 61 and thence back to the regenerator 21 for temperature control therein. Air or other suitable regenerating medium is supplied to line 55 through line 62 to convey the solid material discharged through valve 47 through the exchanger 22. Outlet 24 serves for the withdrawal of regenerated contact material which is forwarded to the conversion system through standpipe 2.

Gaseous revivification products containing a relatively small proportion of the total contact material introduced into the revivification zone through line 19 are withdrawn by outlet pipe 25 and passed through a solid-gas separating system 13a and 14a similar to elements 13 and 14 and the contact material thus recovered is returned to the dense phase zone A' or to any other suitable point in the system.

The height of the upper level in the dense phase of zones A and A' is dependent upon the total quantity of contact material circulated in the system which quantity may be varied by withdrawal of contact material from the system through valved line 49 to storage when lowering of the level is desired and by the addition of contact material to the system through line 49 when raising of the level is desired. The relative height of the level in zone A to that of zone A' is controlled for a fixed quantity of contact material by suitable regulation of the discharge rates through valves 18, 18a, 46 and 47.

It will be apparent to those skilled in the art, from the foregoing description, that the procedure described with reference to Fig. 1 may be advantageously applied to a wide variety of chemical reactions involving the contact of a reactant in the vapor phase with particles of a solid contact agent, either in a single stage or by a cyclic process involving an alteration of the characteristics of the particles of contact material in one stage, such as a conversion stage, and the restoration of these characteristics in a second stage, as for example by a regeneration treatment. The solid contact material may be selected from a class of material adapted to act either, (1) as a solid reactant which undergoes chemical interaction with the component in the vapor phase, (2) as a catalyst to accelerate the reaction in the desired direction, (3) as a means to control physical conditions, such as temperature within the desired limits, or (4) as a means to perform a combination of two or more of these functions. Further, the solid contact material may consist of a single type of component or it may comprise 2 or more separate components, each of which performs one or more of the enumerated functions.

The process is especially advantageous as applied to the production of intermediate stage conversion products by reactions which proceed successively through several stages, but under uncontrolled conditions, pass through such stages, due to the difficulty of temperature control at such a rate that ultimate conversion products are produced of relatively little value. The partial oxidation of hydrocarbons exemplifies this class of reactions; for example, the conversion of a normally gaseous hydrocarbon such as methane to formaldehyde and the partial oxidation of aromatic hydrocarbons such as naphthalene to phthalic anhydride.

Figure 2:
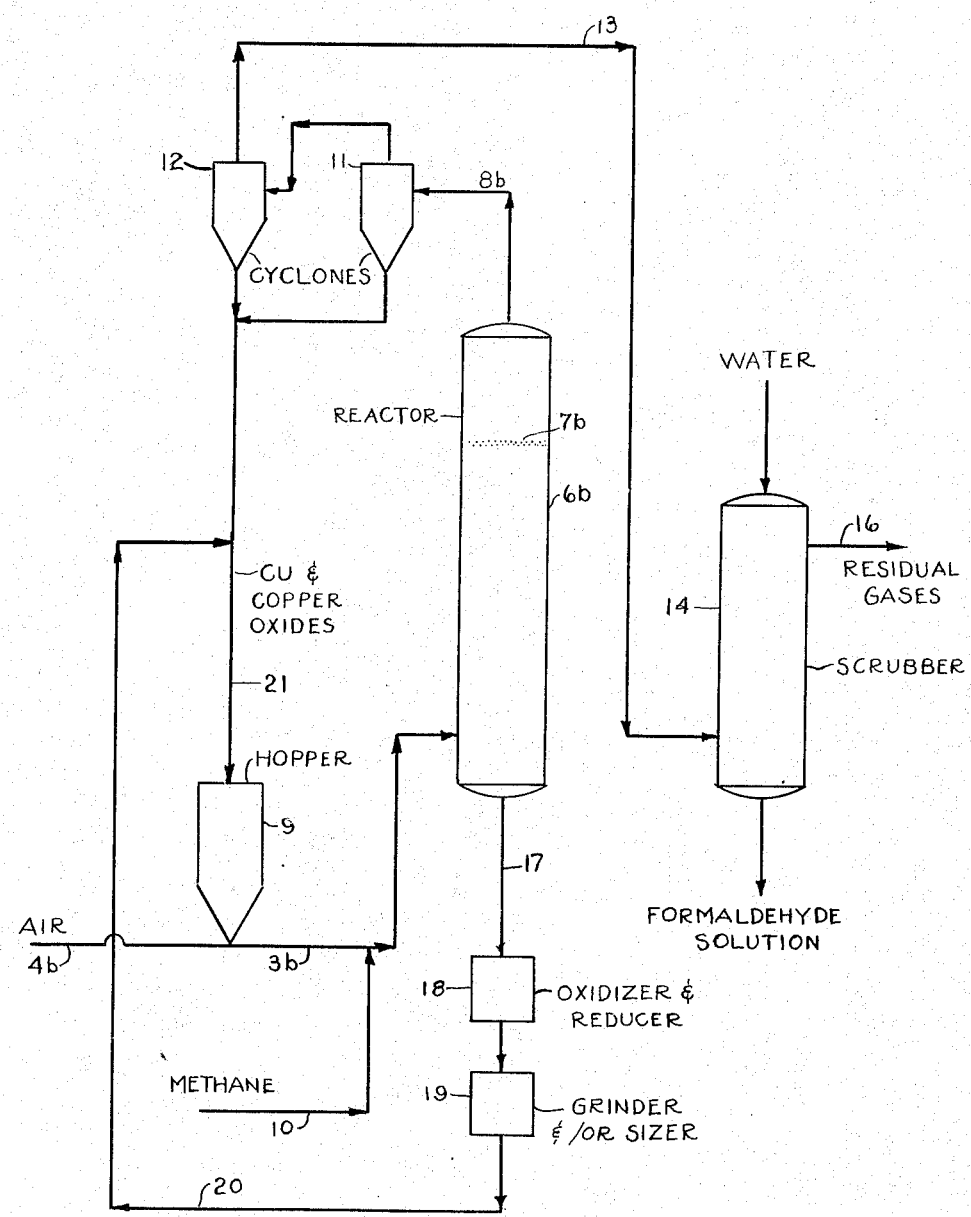
Fig. 2 illustrates diagrammatically a suitable arrangement of apparatus and process flow for practicing the invention as applied to the partial oxidation of hydrocarbons by a catalytic process, as for instance the conversion of a mixture of methane and air to formaldehyde over a catalyst comprising copper oxide.

Fig. 2 illustrates a suitable process flow and an arrangement of apparatus for the catalytic oxidation of methane to formaldehyde in accordance with the reaction represented by the following equation:

$$CH_4 + O_2 \rightarrow CH_2O + H_2O$$

The reaction of oxygen with methane to give formaldehyde and water is exothermic to the extent of about 67,000 calories per gram mol of formaldehyde produced at 1000° F., the latter temperature representing an approximate preferred temperature of reaction when either the oxide of copper or silver is employed as the catalyst.

Elements of Fig. 2 corresponding in their general functions to similar elements in Fig. 1 are indicated thereon by corresponding reference numerals with the subscript "b." An oxygen-containing gas such as air is introduced into the system through line 4b. Finely divided particles of a solid contact material such as particles of copper oxide or a mixture of copper and copper oxide are introduced to the stream of air flowing through line 4b from hopper 9. Methane, or other suitable gaseous reactant, is supplied to line 3b through line 10. The dimensions of the reactor 6b and the quantity and character of the reactants introduced through line 3b are such as to provide a highly turbulent pseudo-liquid phase therein as previously described, an upper level for this dense phase being indicated by dotted line 7b. In the system shown, level 7b is preferably maintained at a suitable distance from outlet 8b so that only a relatively small amount of the introduced particles of solid contact material pass out overhead with the gaseous conversion products for ultimate recovery in the gas solid recovery system comprising cyclones 11 and 12. Gaseous conversion products including formaldehyde, unconverted methane and any additional side reaction products withdrawn overhead from cyclone 12 are passed to a suitable products recovery system such as a scrubber 14 by transfer line 13. In scrubber 14 the gaseous products are passed in counterflow with a suitable scrubbing liquid such as water, and are withdrawn and recovered as the desired product from the bottom thereof in solution.

Residual gases are withdrawn from the top of the scrubber through line 16 and may either be withdrawn from the system, or the unconverted portion thereof may be recycled to the feed inlet.

Used catalyst particles may be continuously withdrawn from the reactor through outlet line 17 and passed to a suitable revivification stage 18. In this particular case, the regeneration process may consist of alternating oxidation and reduction treatments to restore the catalyst particles substantially to their original condition with respect to surface and particle size since the particles normally show a tendency to sinter or agglomerate to larger particles during the conversion.

From revivification zone 18 the particles may be further subjected to a suitable grinding and/or sizing operation in zone 19, if necessary, to further reduce the particles to their original particle size. From zone 19 the particles are recycled back to hopper 9 through lines 20 and 21 together with the particles withdrawn from the bottom portions of cyclones 11 and 12.

In the above flow each of the various components may be suitably introduced through line 3b to the reactor at room temperature, and the turbulent pseudo-liquid phase in the reactor thereby maintained at a suitable uniform elevated temperature, for example about 1000° F. The powdered copper oxide catalyst in the pseudo-liquid phase is in constant and rapid agitation and as a result there is practically no temperature gradient throughout the height of the reaction space, despite the highly exothermic character of the reaction. The gaseous components, air and methane, at room temperature will absorb 10,000 calories in going from room temperature to 1000° F., thus leaving about 58,000 calories to be otherwise removed. Assuming copper oxide is the catalyst employed, about 2.5 lbs. of the catalyst at room temperature may be added per mol of methane reactant, and the copper oxide thus added will absorb 58,000 calories in going from room temperature to 1000° F., corresponding to about 1.5 lbs./catalyst per cu. ft. of gaseous reactants introduced to the reaction zone. In the event that the recycled catalyst as withdrawn from hopper 9 would otherwise be at a temperature above the desired room temperature, a separate cooler may be provided in line 20 similar in construction and purpose to exchanger 26 of Figure 1. Since normally it is preferred to operate with an excess of methane, or in the presence of diluent gas such as nitrogen or the like, the inlet loading of catalyst particles in the gas stream will usually be less than 1 lb. per cu. ft. of entering gas. As heat absorbent capacities of particular solids vary, the inlet quantity of catalyst must be adjusted in accordance with the particular catalyst employed. In this particular example, the copper oxide constituting the solid contact material has several functions since the relatively large quantity of catalyst added is for the purpose of heat absorption as well as for catalysis. If desired, the quantity of copper oxide in excess of that required for catalysis may be replaced by particles of a suitable inert solid, thereby utilizing a contact material comprising two components to subserve the separate functions of catalysis and heat absorption.

Figure 3:
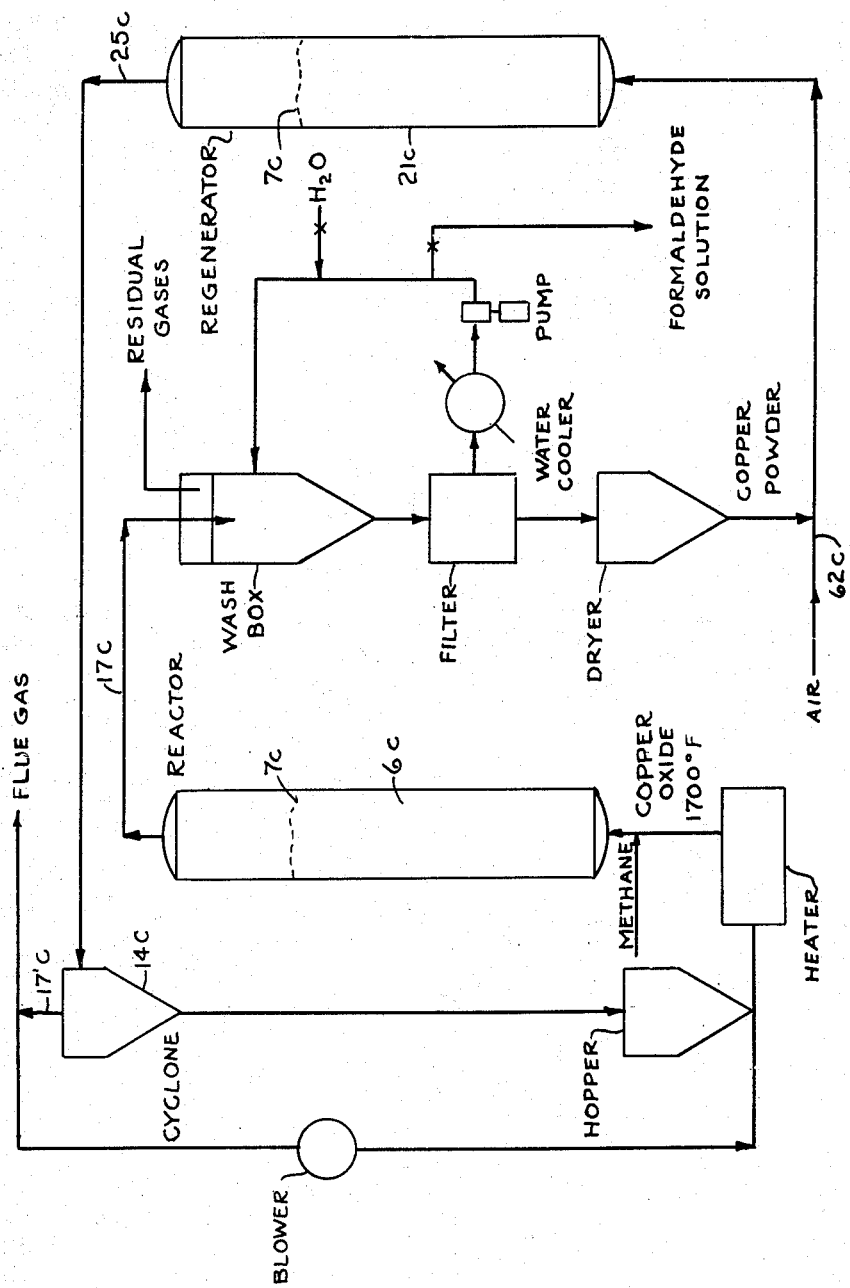
Fig. 3 illustrates diagrammatically a suitable arrangement of apparatus and process flow for the practice of the invention as applied to the production of oxygenated hydrocarbon by interaction of hydrocarbons and metallic oxides, as for example the production of formaldehyde by chemical interaction between methane and copper oxide.

Fig. 3 illustrates the application of the process to a reaction involving the chemical interaction of the particles of solid contact material with the gaseous component, specifically the production of formaldehyde by a reaction represented by the following equation:

$$CH_4 + 2CuO \rightarrow HCHO + H_2O + 2Cu$$

Elements of Fig. 3, corresponding generally in their function to corresponding elements of Fig. 1, have been indicated by similar reference numerals with the subscript "c" and hence a detailed description thereof is unnecessary.

The above reaction is somewhat endothermic and accordingly the required desired uniform temperature of the reaction zone, for example about 1000° F., may suitably be supplied by supplying the copper oxide to the conversion zone at a higher temperature than the conversion temperature, for example a temperature of 1700° F. The copper oxide is reduced to copper or a lower form of oxide in the conversion zone 6c and thereafter it is reoxidized in the regeneration zone 7'c.

From the foregoing, it will be apparent that the process is generally applicable to chemical reactions requiring for their completion a change in the total heat energy content of the reaction system, that is, reactions of either an exothermic or endothermic character. It will be evident that by the present process a substantially uniform and optimum conversion temperature in the turbulent pseudo-liquid phase may be maintained by introducing the particles of solid contact material in such amount and at such a temperature level as to either absorb or add the heat required to maintain the reaction at the desired uniform optimum level. The particles thus added may be supplemented by in part, or be entirely constituted by a stream of particles withdrawn from the pseudo-liquid phase and recycled thereto after passage through a suitable cooling and/or heating zone, as required.

I claim:

1. A process for the conversion of hydrocarbons to intermediate oxygenated organic compounds which comprises passing in vapor form a hydrocarbon selected from the group consisting of normally gaseous aliphatic hydrocarbons and the aromatic hydrocarbons having molecular weights not higher than naphthalene through a first passageway of relatively restricted cross-section at a relatively high velocity into a first enlarged reaction zone containing finely divided contact material comprising copper oxide as substantially the sole oxidizing material, passing said hydrocarbon vapors upwardly through said first reaction zone at a relatively low velocity effective to maintain said contact material as a relatively dense turbulent pseudo-liquid mass having a definite level therein to form an upper solids-gas disengaging zone, maintaining said first reaction zone at an appropriate temperature such that copper oxide reacts with said hydrocarbon to produce intermediate oxygenated organic compounds and to substantially reduce the copper oxide and at which temperature the finely divided copper oxide is maintained in a fluidized condition, continuously withdrawing intermediate oxygenated organic compounds and reduced copper oxide from said first reaction zone, passing air through a second passageway of relatively restricted cross-section at a relatively high velocity into a second enlarged reaction zone containing reduced copper oxide, passing air upwardly through said second reaction zone at a relatively low velocity effective to maintain said contact material as a relatively dense pseudo-liquid mass having a definite level therein to form an upper solids-gas disengaging zone, maintaining said second reaction zone under conditions such that the reduced copper oxide is oxidized, continuously withdrawing contact material comprising reoxidized copper oxide from said second reaction zone, introducing same into said first passageway whereby reoxidized copper oxide is entrained in the hydrocarbon vapors therein and passed to said first reaction zone, and introducing reduced copper oxide withdrawn from said first reaction zone into said second pasageway whereby said contact material is entrained in the air and passed to said second reaction zone.

2. A process for the conversion of naphthalene to phthalic anhydride which comprises passing naphthalene through a first passageway of relatively restricted cross section at a relatively high velocity into a first enlarged reaction zone containing finely-divided copper oxide as substantially the sole oxidixing material, passing naphthalene upwardly through said first reaction zone at a relatively low velocity effective to maintain said copper oxide particles as a relatively dense turbulent pseudo-liquid mass having a definite level therein to form an upper solids-gas disengaging zone, maintaining said first reaction zone at an appropriate temperature such that copper oxide reacts with naphthalene to produce phthalic anhydride and to substantially reduce the copper oxide and at which temperature the finely divided copper oxide is maintained in a fluidized condition, continuously withdrawing phthalic anhydride as a product of the process from said first reaction zone, passing air through a second pas- sageway of relatively restricted cross section at a relatively high velocity into a second enlarged reaction zone containing finely-divided reduced copper oxide, passing air upwardly through said second reaction zone at a relatively low velocity effective to maintain reduced copper oxide as a relatively dense turbulent pseudo-liquid mass having a definite level therein to form an upper solids-gas disengaging zone, maintaining said second reaction zone under conditions such that reduced copper oxide is reoxidized, withdrawing reoxidized copper oxide from said second reaction zone and introducing same into said first passageway whereby the copper oxide is entrained in naphthalene and passed to said first reaction zone, and withdrawing reduced copper oxide from said first reaction zone and introducing same into said second passageway whereby reduced copper oxide is entrained in air and passed to said second reaction zone.

3. A process for the conversion of methane to formaldehyde which comprises passing methane through a first passageway of relatively restricted cross section at a relatively high velocity into a first enlarged reaction zone containing finely-divided copper oxide as substantially the sole oxidizing material, passing methane upwardly through said first reaction zone at a relatively low velocity effective to maintain said copper oxide contact material as a relatively dense turbulent pseudo-liquid mass having a definite level therein to form an upper solids-gas disengaging zone, maintaining said first reaction zone at a temperature of about 1000° F. to react methane with copper oxide to produce formaldehyde and substantially reduce copper oxide, passing air through a second passageway of relatively restricted cross section at a relatively high velocity into a second enlarged reaction zone containing finely-divided reduced copper oxide, passing air upwardly through said second reaction zone at a relatively low velocity effective to maintain said copper oxide as a relatively dense turbulent pseudo-liquid mass having a definite level therein to form an upper solids-gas disengaging zone, maintaining said second reaction zone under conditions such that reduced copper oxide is reoxidized, withdrawing reoxidized copper oxide from said second reaction zone and introducing same at a temperature of approximately 1700° F. into said first passageway whereby methane is preheated to the reaction temperature and reoxdized copper oxide is entrained and passed to said first reaction zone, and withdrawing reduced copper oxide from said first reaction zone and introducing same into said second passageway whereby reduced copper oxide is entrained in the air and passed to said second reaction zone.

4. A process for the conversion of methane to formaldehyde which comprises introducing methane into a first reaction zone containing finely-divided copper oxide as substantially the sole oxidizing material, passing gases upwardly through said first reaction zone at a relatively low velocity effective to maintain said copper oxide as a relatively dense turbulent pseudo-liquid mass having a definite level therein to form an upper solids-gas disengaging zone, maintaining said first reaction zone at an appropriate temperature such that copper oxide reacts with methane to produce formaldehyde and to substantially reduce copper oxide and at which temperature the finely divided copper oxide is maintained in a fluidized condition, withdrawing from the upper portion of said first reaction zone an effluent containing formaldehyde and entrained reduced copper oxide particles, contacting said effluent with a stream of water to dissolve said formaldehyde and to remove said entrained reduced copper oxide, filtering reduced copper oxide from the resulting slurry, drying reduced copper oxide thus recovered, and passing same together with air into a second reaction zone, passing gases upwardly through said second reaction zone at a relatively low velocity effective to maintain said contact material as a relatively dense turbulent pseudo-liquid mass having definite level therein to form an upper solids-gas disengaging zone, maintaining said second reaction zone under conditions such that reduced copper oxide is reoxidized, withdrawing from the upper portion of said second reaction zone an effluent containing entrained reoxidized copper oxide, separating entrained copper oxide from the effluent of said second reaction zone, passing a portion of said effluent after removal of reoxidized copper oxide therefrom to said first reaction zone, and introducing the recovered reoxidized copper oxide into that portion of the effluent from the second reaction zone which is passed to the first reaction zone.

5. A process for the conversion of methane to formaldehyde which comprises introducing methane into a first reaction zone containing finely-divided copper oxide as substantially the sole oxidizing material, passing gases upwardly through said first reaction zone at a relatively low velocity effective to maintain said copper oxide as a relatively dense turbulent pseudo-liquid mass having a definite level therein to form an upper solids-gas disengaging zone, maintaining said first reaction zone at an appropriate temperature such that copper oxide reacts with methane to produce formaldehyde and to substantially reduce copper oxide and at which temperature the finely divided copper oxide is maintained in a fluidized condition, withdrawing from the upper portion of said first reaction zone an effluent containing formaldehyde and entrained reduced copper oxide particles, recovering reduced copper oxide from the effluent from said first reaction zone, and passing same together with air into a second reaction zone, passing gases upwardly through said second reaction zone at a relatively low velocity effective to maintain said contact material as a relatively dense turbulent pseudo-liquid mass having a definite level therein to form an upper solids-gas disengaging zone, maintaining said second reaction zone under conditions such that reduced copper oxide is reoxidized, withdrawing from the upper portion of said second reaction zone an effluent containing entrained reoxidized copper oxide, separating entrained copper oxide from the effluent of said second reaction zone, passing a portion of said effluent after removal of reoxidized copper oxide therefrom to said first reaction zone, and introducing the recovered reoxidized copper oxide into that portion of the effluent from the second reaction zone which is passed to the first reaction zone.

PERCIVAL C. KEITH.

REFERENCES CITED

The following references are of record in the file of this patent:

UNITED STATES PATENTS

| Number | Name | Date |
| --- | --- | --- |
| 1,836,325 | James | Dec. 15, 1931 |
| 1,984,380 | Odell | Dec. 18, 1934 |
| 2,270,903 | Rudbach | Jan. 27, 1942 |
| 2,271,148 | Becker et al. | Jan. 27, 1942 |
| 2,304,128 | Thomas | Dec. 8, 1942 |
| 2,316,664 | Brassert et al. | Apr. 13, 1943 |
| 2,360,787 | Murphree et al. | Oct. 17, 1944 |
| 2,362,296 | Murphree et al. | Nov. 7, 1944 |
| 2,373,008 | Becker | Apr. 3, 1945 |
| 2,378,531 | Becker | June 19, 1945 |
| 2,378,542 | Edmister | June 19, 1945 |
| 2,382,382 | Carlsmith et al. | Aug. 14, 1945 |
| 2,389,133 | Brassert et al. | Nov. 20, 1945 |
| 2,421,664 | Tyson | June 3, 1947 |
| 2,424,467 | Johnson | July 22, 1947 |
| 2,425,754 | Murphree et al. | Aug. 19, 1947 |
| 2,425,849 | Voorhees | Aug. 19, 1947 |
| 2,498,088 | Lewis et al. | Feb. 21, 1950 |
| 2,515,373 | Keith et al. | July 18, 1950 |
| 2,518,693 | Jahnig | Aug. 15, 1950 |

FOREIGN PATENTS

| Number | Country | Date |
| --- | --- | --- |
| 559,080 | Great Britain | Feb. 3, 1944 |